United States Patent
Hong

[19]

[11] Patent Number: 5,978,211
[45] Date of Patent: Nov. 2, 1999

[54] STAND STRUCTURE FOR FLAT-PANEL DISPLAY DEVICE WITH INTERFACE AND SPEAKER

[75] Inventor: Yu-Sik Hong, Kyungki-do, Rep. of Korea

[73] Assignee: SamSung Electronics Co., Ltd., Kyungki-do, Rep. of Korea

[21] Appl. No.: 08/965,643

[22] Filed: Nov. 6, 1997

[30] Foreign Application Priority Data

Nov. 19, 1996 [KR] Rep. of Korea ............... 96 52396

[51] Int. Cl.⁶ .................. G06F 1/16; H04R 1/02
[52] U.S. Cl. ................ 361/683; 381/388; 381/333; 381/306
[58] Field of Search ............... 361/681–683; 381/87, 88, 306, 309, 333, 386; 248/917, 918, 919, 922; 345/905

[56] References Cited

U.S. PATENT DOCUMENTS

| | | |
|---|---|---|
| 4,310,136 | 1/1982 | Mooney . |
| 4,365,779 | 12/1982 | Bates et al. . |
| 4,437,638 | 3/1984 | Scheibenpflug . |
| 4,447,031 | 5/1984 | Souder, Jr. et al. . |
| 4,589,713 | 5/1986 | Pfuhl et al. . |
| 4,691,886 | 9/1987 | Wendling et al. . |
| 4,762,378 | 8/1988 | Kagami . |
| 4,944,481 | 7/1990 | Yurchenco et al. . |
| 5,108,062 | 4/1992 | Detwiler . |
| 5,271,594 | 12/1993 | Djelouah . |
| 5,335,142 | 8/1994 | Anderson . |
| 5,400,408 | 3/1995 | Lundgren et al. ............ 381/88 |
| 5,582,470 | 12/1996 | Yu ............................ 312/208.3 |
| 5,587,876 | 12/1996 | O'Brien et al. ............ 361/682 |
| 5,588,625 | 12/1996 | Baek . |
| 5,632,463 | 5/1997 | Sung et al. . |
| 5,633,943 | 5/1997 | Daniels et al. ............ 381/188 |
| 5,689,574 | 11/1997 | Heirich et al. ............ 381/158 |
| 5,696,814 | 12/1997 | Tran et al. ................ 379/110 |
| 5,870,485 | 2/1999 | Lundgren et al. ......... 381/306 |

*Primary Examiner*—Lynn D. Feild
*Attorney, Agent, or Firm*—Robert E. Bushnell, Esq.

[57] ABSTRACT

A stand structure for a flat-panel display device, including a stand body; and an interface circuit board installed within the stand body, electrically connecting the flat-panel display device with a host computer and a power supply input. An input unit cover is attached to the stand body, covering the interface circuit board while providing external electrical access thereto. A speaker unit is electrically connected to the host computer via the interface circuit board. A through-hole is formed in the upper portion of the stand body, through which passes a cable carrying electrical power and display control signals from the interface circuit board. A hinge assembly, having a horizontal shaft, rotates about a vertical shaft in the stand body. Two auxiliary external connections, for a headphone audio output and a microphone audio input, are provided.

11 Claims, 3 Drawing Sheets

STAND STRUCTURE FOR FLAT-PANEL DISPLAY DEVICE WITH INTERFACE AND SPEAKER

CLAIM OF PRIORITY

This application makes reference to, incorporates the same herein, and claims all benefits accruing under 35 U.S.C. §119 from an application entitled Stand Structure For Flat-Panel Display Device earlier filed in the Korean Industrial Property Office on the 6$^{th}$ November 6, and there duly assigned Ser. No. 96-52396 by that Office.

BACKGROUND OF THE INVENTION

1. Field of the Invention

The present invention relates to a stand structure for a flat-panel display device and, more particularly, to a compact stand structure having a small footprint and multimedia host computer interfacing capability.

2. Discussion of Related Art

Among widely used devices for displaying the video information of a multimedia computer, flat-panel display devices (e.g., liquid crystal displays) are becoming more prevalent due to their light weight and compact design. Such a flat-panel display device largely includes a thin LCD unit as the display portion of the device and a stand unit for supporting the display. In addition, mechanism for adjusting the display angle generally are provided, wherein a user operates a hinge unit to control the viewing angle of the display with respect to the stand unit, usually along a horizontal axis for tilting the LCD unit forward and rearward. To achieve these objectives, it has become necessary to provide a supporting stand unit with an approximate size determined by the horizontal dimension (length) of the LCD unit. Therefore, the dimensions of the stand unit have come to be substantially equivalent to those of the LCD unit, such that the footprint is overly large and consumes excessive desk space. The stand unit of the conventional LCD device is bulky and serves as mere supporting means for the display unit, with no multi-media capability. However, there is a practical limit to downsizing the stand unit and, particularly its footprint, especially if auxiliary functions (e.g., audio input/output) are to be provided for the display device.

Exemplars of the contemporary practice in the art include U.S. Pat. No. 4,310,136, issued to Mooney for Backlash-Free Swivel And Tilt Mounting which describes an oversized support shaft journaled in dual ball bearings housed in a base. The base includes a plate with an aperture receiving a cylindrical section of a support shaft, rotatably secured therein with a set of bearings. The device does not include a central inner passage for a cable. U.S. Pat. No. 4,437,638, issued to Scheibenpflug for Arrangement For Fastening A monitor To A Text Station describes a monitor mounted on a support column with a bracket having holes registered with holes in the support column, a shaft being received therethrough. The support column defines an inner race slidingly received in an outer race of extension arm, providing rotational freedom therebetween. The device does not include a central inner passage for a cable. U.S. Pat. No. 4,447,031, issued to Souder et al. for Spring Counterbalanced Support Arm System describes a nose bracket mounted on a television set. The nose bracket includes flanges with registered holes. Screws received in the holes engage an anchor tube receiving a tension pin engaged with a swivel arm. The tension pin provides for relative rotation between the swivel arm and nose bracket. The device does not include a central inner passage for a cable. U.S. Pat. No. 5,335,142, issued to Portable Computer Display Tilt/Swivel Mechanism describes a yoke 42 with flanges having registered holes. A tilt base has complementary flanges with registered holes. The yoke and base holes receive a hollow tilt tube. The base mounts on a swivel disk received within a groove defined by a split mounting ring. The device does not include a hinge member having a central aperture configured to receive a vertical hinge shaft, fixed relative to a stand, providing a central inner passage for a cable. U.S. Pat. No. 4,762,378, issued to Kagami for Display Apparatus describes a base with oblique or offset upstanding flanges with registered holes. The chassis and neck frame of a monitor pivot relative to the base about a connecting bolt received in the holes. The device does not include a hinge member having a central aperture configured to receive a vertical hinge shaft, fixed relative to a stand, providing a central inner passage for a cable. U.S. Pat. No. 4,944,481, issued to Yurchenco et al. for Balanced monitor Stand describes a base with an oblique tab having a first horizontal throughbore. A platform mounted on a monitor has a second throughbore in registry with the first throughbore. The tab and platform rotate in a vertical plane about a pin received in the throughbores. The device does not provide for rotation of the monitor. U.S. Pat. No. 5,108,062, issued to Detwiler for Pivot Apparatus describes a clam shell socket member rotatably secured to a housing member. A leg portion extends from one of the clam shell socket members to a base portion mounted in a base member. The device does not provide for rotation of the monitor. U.S. Pat. No. 5,588,625, issued to Baek for Monitor Stand Assembly, U.S. Pat. No. 4,365,779, issued to Bates et al. for Tilt And Rotate Apparatus For A Display Monitor and U.S. Pat. No. 5,632,463, issued to Sung et al. for Monitor Stand Assembly describe an upper stand portion having a slot. A stand base portion has a coupler bar received in the slot. When the upper stand portion is rotated relative to the stand base portion, projections of the coupler bar prevent disassembly thereof. The devices do not convey a cable through a hinge member having a central aperture configured to receive a vertical hinge shaft, fixed relative to a stand. U.S. Pat. No. 4,589,713, issued to Phuhl et al. for Video Display Support Joint describes a stand including upstanding, ribbed prongs. A connector ring, mounted on a monitor, has holes that receive the prongs. The connector ring traps a bottom casing and a protector cover, which provide tilting capability in the monitor relative to the stand, against the stand. The device employs a complicated assembly of multiple parts obviated by the present unitary hinge body. U.S. Pat. No. 4,691,886, issued to Wendling et al. for an Adjustable Display Stand describes a base with a detachable lower segment. The lower segment is not described as counterbalancing a display unit, or possessing any weight that inherently might counterbalance an upsetting, offset display unit center of gravity. U.S. Pat. No. 5,271,594, issued to Djelouah for a Solar Lamp Stand describes a receptacle demountably connected to a box. The box includes a detachable base plate. The base plate is constructed from plastic and an orifice with which the base plate is fastened to the ground.

After careful study of the exemplars of contemporary practice in the art, I have found a need for a flat-panel display apparatus including a dual-axis hinge conducting signal and power cable therethrough from an interface mounted in the stand that provides auxiliary connectors.

SUMMARY OF THE INVENTION

It is an object of the present invention to provide an improved stand structure for a flat-panel display device having a small footprint to reduce occupied desk space.

It is another object of the present invention to provide a stand structure for a flat-panel display device in which an interface circuit board and speaker unit are installed to provide multi-media capability.

To achieve these and other advantages and in accordance with the purpose of the present invention, as embodied and broadly described, the present invention provides a stand structure for a flat-panel display device, including: a stand body; and an interface installed within the stand body, for electrically connecting the flat-panel display device with a host computer and a power supply. The stand structure also includes a speaker unit which is electrically connected to the host computer via the interface. The interface has auxiliary external connections for a headphone audio output and a microphone audio input.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
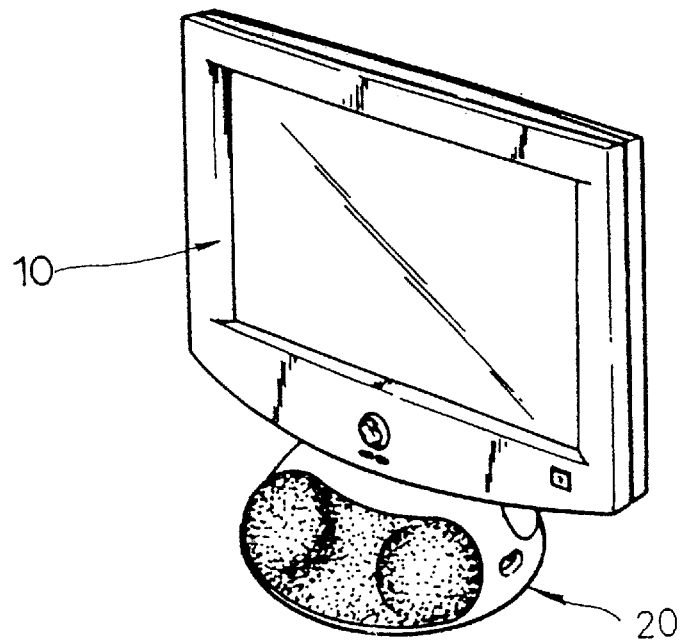
FIGS. 1A and 1B are top right front and left rear perspective views of a flat-panel display device having a stand structure constructed according to the principles of the present invention.
Figure 1B:
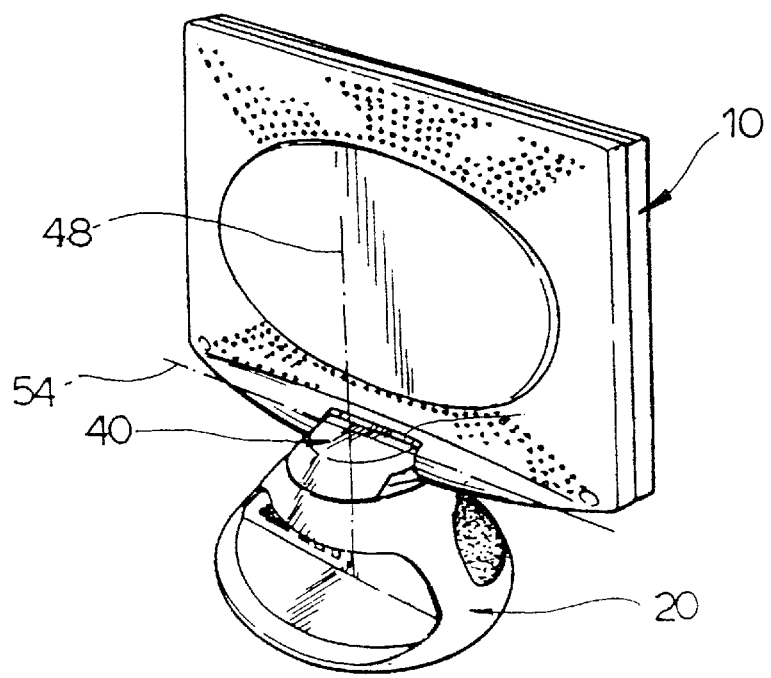

Referring now to the drawings, and FIGS. 1A and 1B in particular, the flat-panel display device to which a stand structure according to the present invention largely includes a display unit 10 on which video information is displayed, a stand unit 20 for supporting the display unit, and a hinge assembly 40, only shown on FIG. 1B, provided between the display and stand units allowing a user to control the viewing angle of the display device. Here, it should be appreciated that the stand structure of the present invention provides for dual-axis adjustment of the display, along a vertical axis 48 as well as a horizontal axis 54.

Figure 2:
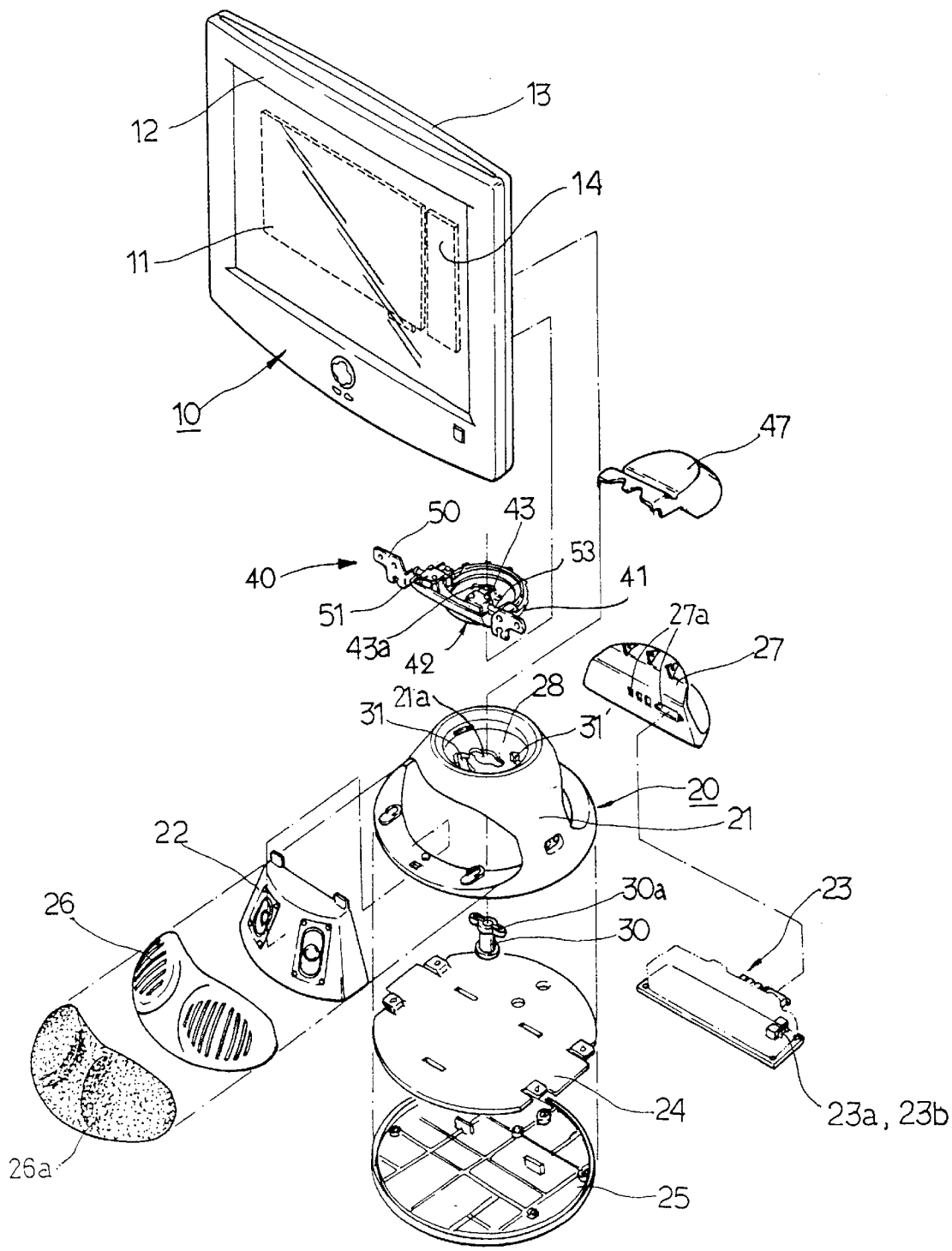
FIG. 2 is a top right front exploded perspective view of the stand structure for a flat-panel display device constructed in accordance with principles of the present invention.

As shown in FIG. 2, the display unit 10 includes an LCD panel 11 for displaying images in accordance with video data supplied from a main circuit board 14, both of which being sandwiched between front and rear cases 12 and 13.

The stand unit 20 is designed for housing a speaker unit 22 and an interface circuit board 23. The speaker unit 22 is installed on the forepart of a stand body 21 for projecting sound forward. The interface circuit board 23 is mounted at the rear part of the stand body 21 allowing access for video signal and power supply input. A speaker cover 26 protects the speaker unit 22 installed within the stand body 21. A contaminant protector 26a covers the speaker cover 26. An input unit cover 27, having a plurality of connector holes 27a for connecting the signal and power cables, is provided to the rear of the stand unit 20 to cover the interface circuit board 23. A bottom cover 25, to which a weight 24 is fixed, is mounted on the bottom of the stand body 21.

The hinge assembly 40 largely includes a hinge body 41 with a bottom side having a rotation guide surface 42 received in a rotation guide groove 28 formed in the upper portion of the stand body 21 to provide for smooth rotation. A hinge shaft insertion opening 43 with an insertion guide hole 43a is formed at the middle of hinge body 41 into which a vertical hinge shaft 30, perpendicularly installed in a vertical axis guide 21a of the rotation guide groove 28, is inserted. At the same time, dislocation preventing ribs 30a, formed on either side of the vertical hinge shaft 30, also are inserted into the hinge shaft insertion opening 43. By turning the hinge body 41, the dislocation preventing ribs 30a of the hinge shaft 30 intersect with the hinge shaft insertion opening 43, thus preventing dislocation of the hinge shaft 30. In other words, the ribs 30a are misaligned with the insertion guide hole 43a such that the ribs 30a prevent disassembly of the hinge body 41 from the vertical hinge shaft 30.

Figure 3:
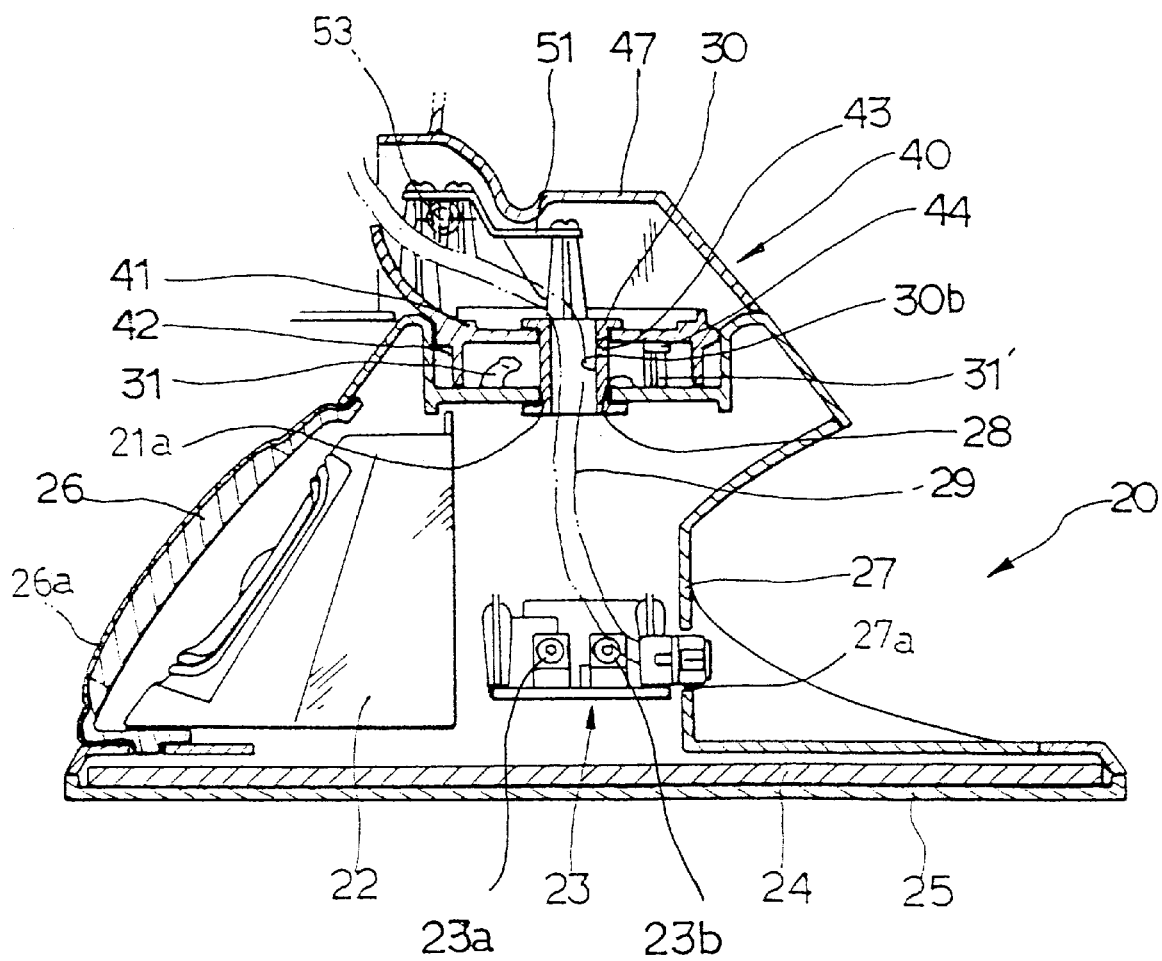
FIG. 3 is a partial right side cross-sectional detail view of the stand structure for a flat-panel display device constructed in accordance with principles of the present invention.

An elastic projection 31 and a fixed projection 31' extend from the stand body 20 inside the rotation guide groove 28, to establish a rotation angle, or limits between which the hinge may rotate. Here, a stop 44, shown on FIG. 3, is formed on the bottom surface of the hinge body 41, to push against and pass over the elastic projection 31, but be stopped by the fixed projection 31'. In other words, once the vertical hinge shaft 30 is installed in the vertical axis guide 21a and fixed to the stand body 21, the hinge body 41 is aligned so that the ribs 30a are received through insertion guide hole 43a. When this occurs, the stop 44 contacts the elastic projection 31 and urges it downwardly. Once the ribs 30a pass through the insertion guide hole 43a, the hinge body 41 is rotated clockwise until the stop 44 clears and releases the elastic projection 31, allowing it to assume its intended design position. Thereafter, the stop 44 is trapped between the elastic projection 31 and fixed projection 31'.

The hinge body 41 is provided with a horizontal-axis pivoting element constituted by a horizontal shaft unit 53 to which brackets 50 and 51 respectively couple the display unit 10 and the hinge unit 40, for forward and backward tilting of the display with respect to the stand. The hinge body 41 is covered entirely by a hinge cover 47.

Referring to FIG. 3, an important feature of the present invention is a passageway 30b through the center of the vertical hinge shaft 30 which allows a cable 29 from the interface circuit board 23 to be connected with the main circuit board 14, shown in FIG. 2. The cable 29 carries externally-supplied display signals and electrical power. In addition, the proximity of the interface circuit board 23 provides convenient auxiliary connections, such as a microphone audio input 23a and a headphone audio output 23b.

It will be apparent to those skilled in the art that various modifications can be made in the stand structure for a flat-panel display device of the present invention without departing from the spirit of the invention. Thus, it is intended that the present invention cover such modifications as well as variations thereof within the scope of the appended claims.

What is claimed is:

1. A stand for a flat-panel display device, comprising:

a stand body further comprised of a through-hole in an upper portion thereof, receiving a cable carrying electrical power and display control signals to said flat-panel display device;

an interface, mounted on said stand body, providing electrical power and display control signals to the cable, further comprising:

an auxiliary external connection for a headphone audio output; and an auxiliary external connection for a microphone audio input;

an input unit cover, attached to said stand body, covering said interface and providing external electrical access thereto;

a speaker unit, mounted on said stand body, electrically connected to said interface;

a speaker protector fixed relative to said speaker unit; and a hinge, having a horizontal shaft, rotatable about a shaft extending from said stand body.

2. The stand of claim 1, said hinge further comprising:

a hinge body further comprised of a shaft insertion hole; and a shaft received in said shaft insertion hole, said hinge body being rotatable about the shaft;

said shaft, conducting a cable therethrough, comprising a rib extending therefrom;

said shaft insertion hole further comprised of a shape complementary of said rib;

whereby association and disassociation of said shaft and said hinge body is accomplished only when said rib is aligned with said shaft insertion hole.

3. The stand of claim 2, said hinge body further comprising a rotation guide, configured to be rotated within a rotary guide recess of a stand, extending therefrom.

4. The stand of claim 2, said hinge body further comprising a projection, configured to restrict rotation of said hinge body between a first stop and a second stop, extending therefrom.

5. The stand of claim 4, said first stop comprising a projection extending from a rotary guide recess of a stand.

6. The stand of claim 5, further comprised of said projection being biased relative to the rotary guide recess.

7. The stand of claim 4, said second stop comprising a retainer extending from a rotary guide recess of a stand.

8. The stand of claim 2, further comprised of said shaft being generally vertical.

9. The stand of claim 2, said hinge body further comprising a bracket, configured to be mounted on a display housing, rotatably mounted thereon.

10. The stand of claim 9, said bracket being rotatable about a generally horizontal axis.

11. The stand of claim 2, further comprising a cover mounted on said hinge body.

* * * * *